(12) United States Patent
Müller et al.

(10) Patent No.: US 6,491,980 B1
(45) Date of Patent: Dec. 10, 2002

(54) COATED AIRBAG, COATING MATERIAL AND COATING PROCESS

(75) Inventors: Johann Müller, Konzell (DE); Martin Stömmer, Simbach am Inn (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/448,185

(22) Filed: Nov. 23, 1999

(30) Foreign Application Priority Data

Dec. 11, 1998 (DE) .......................................... 198 57 307

(51) Int. Cl.$^7$ ................................................. B05D 3/02
(52) U.S. Cl. ..................... 427/387; 428/447; 524/730; 524/837; 524/861; 524/862; 525/479; 528/15; 528/31; 528/32
(58) Field of Search .............................. 528/31, 32, 15; 525/479; 524/837, 861, 847, 266, 268, 862, 730; 428/447; 427/387

(56) References Cited

U.S. PATENT DOCUMENTS

| | | | |
|---|---|---|---|
| 4,427,811 A | * | 1/1984 | Elias et al. |
| 4,782,112 A | * | 11/1988 | Kondo et al. |
| 5,085,803 A | * | 2/1992 | Wakita et al. |
| 5,700,870 A | | 12/1997 | Mueller et al. |

FOREIGN PATENT DOCUMENTS

| | | |
|---|---|---|
| EP | 0 552 983 A2 | 7/1993 |
| EP | 0 646 672 A1 | 4/1995 |
| EP | 0 663 468 A1 | 7/1995 |
| EP | 0 669 419 A1 | 8/1995 |
| EP | 0 758 666 A1 | 2/1997 |

OTHER PUBLICATIONS

The English Derwent Abstract 1997–109938 (11) corresponding to EP 0758666 is enclosed.

* cited by examiner

*Primary Examiner*—Robert Dawson
*Assistant Examiner*—Marc S Zimmer
(74) *Attorney, Agent, or Firm*—Brooks & Kushman P.C.

(57) ABSTRACT

An aqueous emulsion comprises
(1) organopolysiloxanes containing SiC-bonded aliphatically unsaturated groups in the terminal units,
(2) organopolysiloxanes containing at least 3 Si-bonded hydrogen atoms,
(3) a catalyst promoting the addition of Si-bonded hydrogen to aliphatic unsaturation,
(4) organosilicon adhesion promoters,
(5) silicone resins,
(6) an emulsifier,
(7) water, and
(8) carbon black.

The emulsions may be applied to fabric prior to drying and shrinking, and vulcanized while drying the fabric. The coated fabrics exhibit ideal characteristics for use as airbag material.

16 Claims, No Drawings

COATED AIRBAG, COATING MATERIAL AND COATING PROCESS

TECHNICAL FIELD

This invention relates to aqueous emulsions, to a process for preparing them, to materials preparable using these aqueous emulsions, to a process for coating organic fibers using such aqueous emulsions, and to textile substrates coated with these emulsions.

BACKGROUND ART

EP-A-758 666 describes aqueous emulsions which contain addition-crosslinking organopolysiloxanes and which are used for coating fabrics for airbags. However, these have the disadvantage that the combustion rate in the horizontal burn test of FMVSS 302 or 208 is too high.

SUMMARY OF INVENTION

It is an object of the present invention to overcome the disadvantages of the prior art and in particular to make available aqueous emulsions which, coated on a textile fabric, provide reduced flammability, especially in the case of airbags, and additionally have a low coating weight, an improved adhesion of the coating as demonstrated by improved values in the ISO 5981 scrub test, and which allow an economical coating process.

DETAILED DESCRIPTION OF THE PREFERRED EMBODIMENTS

The present invention accordingly provides aqueous emulsions comprising
- (1) organopolysiloxanes containing SiC-bonded aliphatically unsaturated groups in terminal units,
- (2) organopolysiloxanes containing at least 3 Si-bonded hydrogen atoms,
- (3) a catalyst which promotes the addition of Si-bonded hydrogen to aliphatic unsaturation,
- (4) organosilicon adhesion promoters,
- (5) optionally silicone resins,
- (6) an emulsifier,
- (7) water, and
- (8) carbon black.

The aliphatically unsaturated groups are preferably vinyl groups or allyl groups, in particular vinyl groups.

The diorganopolysiloxanes (1) according to the invention, which contain SiC-bonded aliphatically unsaturated groups in the terminal units, are preferably diorganopolysiloxanes having vinyl groups bonded to the terminal units, preferably those of the general formula

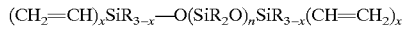

where
- R denotes identical or different hydrocarbyl radicals with preferably 1 to 18 carbon atoms, which may optionally be substituted, and
- x is 1, 2 or 3, preferably 1, and
- n is a number such that the diorganopolysiloxanes (1) preferably have an average viscosity of 100–500,000 mPa·s at 25° C. Preference is given to the range of 200–200,000 mPa·s at 25° C. and particular preference to the range of 500–100,000 mPa·s at 25° C.

Examples of hydrocarbyl radicals R are preferably alkyl radicals such as methyl, ethyl, n-propyl, isopropyl, butyl, octyl, tetradecyl or octadecyl radicals; cycloaliphatic hydrocarbyl radicals such as cyclopentyl, cyclohexyl or methylcyclohexyl radicals; aryl radicals such as phenyl radicals; alkaryl radicals such as tolyl radicals; aralkyl radicals such as benzyl or phenylethyl radicals. Examples of substituted hydrocarbyl radicals are preferably halogenated radicals such as 3,3,3-trifluoropropyl, 3-chloropropyl or chlorophenyl radicals. Similarly, cyanoalkyl radicals such as the cyanoethyl radical, may be present. Radicals with unsaturated aliphatic groups such as, preferably, but without limitation, vinyl, allyl, hexenyl or cyclohexenyl, may likewise be present. R is preferably hydrocarbyl having 1–10 carbon atoms, and most preferably at least 80% of the organic radicals designated R are methyl radicals.

The organopolysiloxanes described above can be identical interpolymers or mixtures of different interpolymers with identical or different degrees of polymerization. If the diorganopolysiloxanes contain different diorganopolysiloxane units, the distribution may be random or block.

In the products of the invention, the diorganopolysiloxane (1) is present in amounts of 10–80% by weight, preferably in amounts of 20–60% by weight, more preferably in amounts of 20 to 50% by weight.

Organopolysiloxanes (2) with at least 3 Si-bonded hydrogen atoms are preferably those of the formula

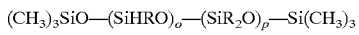

where R may be as defined above and o/p is in a range of from 1:0 to 1:20, preferably from 1:0 to 1:7. The sum of o and p can be between 10–1000, it is preferably 20–200, particularly preferably 30–100. Identical or different organopolysiloxanes (2) can be used.

In the organopolysiloxanes (2) with at least 3 Si-bonded hydrogen atoms per molecule, the silicon valencies not saturated with hydrogen and siloxane oxygen atoms are preferably saturated with methyl, ethyl or phenyl radicals. However, all radicals described above as R can be present.

In the products of the invention, organopolysiloxane (2) is present in amounts of 1–40% by weight, preferably in amounts of 2–20% by weight, more preferably in amounts of 3–15% by weight.

Catalysts (3) promoting the addition of Si-bonded hydrogen to aliphatic unsaturation can be any desired catalysts which are known to promote this reaction. Examples of such catalysts are preferably metallic, finely divided platinum (platinum sol), ruthenium, rhodium, palladium or iridium. These metals may also be present applied to solid supports, such as silica, alumina or activated carbon, ceramic materials or mixed oxides or mixed hydroxides. Similarly compounds or complexes of these metals such as $PtCl_4$, $H_2PtCl_6 \cdot 6H_2O$; $Na_2PtCl_4 \cdot 4H_2O$ platinum-olefin complexes, platinum-alcohol complexes, such as Speyer's catalyst, platinum-alcoholate complexes platinum-ether complexes, platinum-aldehyde complexes, platinum-ketone complexes, such as the reaction products of cyclohexanone and hexachloroplatinic acid, platinum-vinylsiloxane complexes, in particular platinum-divinyltetramethyl-disiloxane complexes with or without organically bound halogen, bis (gamma-picoline)platinum dichloride, trimethylenepyridineplatinum dichloride, dicyclopentadieneplatinum dichloride, dimethylsulfoxydiethyleneplatinum(2) dichloride, and also the reaction products of platinum tetrachloride dissolved in 1-octene, with sec-butylamine. Platinum compounds are preferred for use as catalysts in the product of this invention. It is possible to use catalyst mixtures, or else only one kind of the abovementioned catalysts.

In the product of the invention, the amounts of catalyst used can be such that, in the case of platinum catalysts, the platinum content of the composition is preferably between 3 and 500 ppm, based on the siloxane content. Preference is given to using a platinum content of 10–200 ppm, based on the polysiloxanes used.

Aqueous emulsions can be prepared using any desired adhesion promoters. Examples of organosilicon compounds (4) useful as adhesion promoters are preferably silanes with hydrolyzable radicals and vinyl, acryloyloxy, methacryloyloxy, epoxy or acid anhydride groups bonded to silicon via carbon. It is also possible to use partial hydrolysates and/or mixed hydrolysates of such silanes. Preference is given to using a reaction product of vinyltriacetoxysilane and the silane of the formula

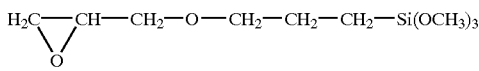

It is possible to use one type of adhesion promoter, or else mixtures of two or more silanes or their reaction products or partial or mixed hydrolysates. The adhesion promoter is preferably used in amounts of 1 to 20% by weight, preferably in amounts of 1 to 10% by weight, more preferably in amounts of 2 to 8% by weight.

The products of the invention may optionally include aqueous emulsions of silicone resins (5), preferably of the general formula $(R_3SiO_{1/2})_a(RSiO_{3/2})_b$, or MT resins and/or MQ resins of the general formula $(R_3SiO_{1/2})_a(SiO_{4/2})_b$, where R is as defined above and is preferably methyl, phenyl, vinyl or hydrogen. The ratio of a to b is chosen so that the silicone resins are within the viscosity range of 30–300,000 mPa·s at 25° C. Preference is given to using silicone resins within the viscosity range of 50–30,000 mPa·s at 25° C., more preferably within the viscosity range from 50 to 10,000 mPa·s at 25° C.

The organosilicon compounds used in this invention are commercially available products or preparable by processes customary in silicone chemistry, and in each case, may be one kind of such organosilicon compound or a mixture of different organosilicon compounds.

Aqueous emulsions containing the abovementioned ingredients may be prepared using any desired emulsifiers (6) which otherwise are customarily used for preparing organopolysiloxane emulsions. Suitable emulsifiers are preferably ionic and nonionic emulsifiers. Preference is given to nonionic emulsifiers. Examples are sulfonic acid and its salts which can act as emulsifier, and alkylsulfonates such as sodium laurylsulfonate, benzenesulfonates substituted by aliphatic hydrocarbyl radicals such as sodium dodecylbenzenesulfonate, naphthalenesulfonates substituted by aliphatic hydrocarbyl radicals, polyethylene glycol sulfonate, phosphates such as lauryl phosphate, polyether surfactants such as polyethylene oxide, polypropylene oxide, interpolymers of ethylene oxide and propylene oxide, stearates, and the like. These are used in amounts of 3% to 20% based on the total silicone content.

The carbon black is preferably gas black, furnace black or lampblack. It is also preferable to use aqueous carbon black dispersions commercially obtainable from Degussa under the names of DERUSSOL, SCHWARZDISPERSION or RUSSDISPERSION. The carbon black dispersions preferably have a solids content of 1 to 50% by weight. The primary particle size of the carbon blacks used may be between 10 and 100 nm. The dispersions may be stabilized anionically, nonionically or anionically/nonionically. The carbon black content based on silicone solids content is preferably between 1 and 50%, more preferably between 3 and 40% by weight, most preferably between 5 and 20% by weight.

In addition to the aforementioned ingredients, the emulsions of this invention may also include further ingredients, preferably filler such as alumina, aluminum hydroxide, pigments, and stabilizers.

The present invention further provides a process for preparing the aqueous emulsions of this invention, which comprises emulsifying ingredients (1) to (8).

In the process of this invention, the ingredients:
(1) organopolysiloxanes with SiC-bonded vinyl groups in the terminal units,
(2) organopolysiloxanes with at least 3 Si-bonded hydrogen atoms,
(3) a catalyst promoting the addition of Si-bonded hydrogen to aliphatic unsaturation,
(4) organosilicon adhesion promoters,
(5) silicone resins,
(6) an emulsifier,
(7) water, and
(8) carbon black, are mutually emulsified, preferably at room temperature (25° C.) and atmospheric pressure. It is also possible to mix finished emulsions/dispersions of individual components. The process can also be carried out at reduced or elevated pressure and at an elevated temperature of up to preferably 80° C., or a reduced temperature of down to preferably 0° C. Room temperature is preferred, if only for economic reasons.

The present invention further provides a process for coating textile substrates, characterized in that it comprises applying aqueous emulsions of this invention to a textile and in one step drying and vulcanizing the emulsions onto textile substrates. In the process of this invention, the aqueous emulsions of this invention are preferably applied to wet textiles coming directly from a washing or cleaning process. The vulcanization of the silicone coating and the drying and shrinking of the textiles can be carried out in one operation.

The present invention further provides a vulcanizate prepared by heating an aqueous emulsion of the compositions of the invention.

To avoid premature crosslinking, the emulsions of this invention are stored in at least two different components. One component preferably comprises the siloxanes with the unsaturated aliphatic groups, another component preferably comprises the siloxanes with Si-bonded hydrogen. Appropriate auxiliary and additive substances may be present in either one or both of the components.

The application of the products of this invention can be carried out in a conventional manner. Examples are dipping and pad-mangling, brushing, casting, spraying, rolling, printing, knife-coating, using a Meyer rod or an air brush, or by lick-rolling and screen printing. The application of the coating material may take place during the washing process, or immediately thereafter. The vulcanization takes place in one operation at the same time as the drying and shrinking process to which the textile is ordinarily subjected.

In the case of wovens which have to be washed and dried, which is true of manufactured-fiber wovens in particular, the composition of this invention is preferably applied directly to the fabric immediately following washing, while the fabric is still wet. The vulcanization takes place at the same time as the drying process. This is particularly desirable and particularly advantageous in the case of wovens used for manufacturing airbags.

Application of the coating by the abovementioned methods is followed by drying and vulcanization of the coated fabric, customarily in a heat duct which can be heated by hot air, infrared light, gas burners, heat exchangers or other energy sources. To avoid blistering, the fabric is predried in a first zone at temperatures of preferably 60–150° C., more preferably 80–130° C., most preferably 90–120° C., and crosslinked in a second zone, preferably at temperatures of up to 300° C. Due to the limited heat resistance of most man-made fibers, the temperature range of 120–190° C. is preferred. The residence time required for vulcanization depends on the coating weight, the thermal conductivity of the fabric and the heat transfer to the coated textile, and can vary between 0.5 and 30 minutes. Apart from customary heat ducts (drying ovens), the drying and vulcanization can also be carried out by means of other technical drying equipment, such as hot roll calenders, heatable laminating presses, heatable plate presses or hot contact rolls, and also by means of festoon dryers. The textiles coated according to the invention can also be dried and vulcanized using microwaves.

The products of the invention can be used for coating or finishing textile materials of any kind. Wovens of all weave constructions, nonwovens, loop-drawn knits, non-woven scrims, loop-formed knits from all customary yarns and fibers, natural fibers such as cotton, wool, and silk, manufactured fibers such as glass, polyamides, polyester, viscose, polyethylene, polypropylene, polyurethane, and cellulose can be coated. The applications for the textiles thus finished are numerous. Examples are sportswear, sports articles such as sails, boat covers or materials for rucksacks, and tents and protective clothing. Industrial applications include tarpaulins, conveyor belts, compensators, foldable containers.

Polyamide or polyester fabrics finished with the products of this invention can be used with particular advantage for manufacturing airbags for motor vehicles.

Industrial fabrics usually need to be washed, dried and shrunken in order to meet stringent requirements. This is particularly true in manufacturing airbags. All prior art coating processes require a separate coating step after washing and drying the fabric. In the process of the present invention, the coating material of this invention can be applied directly in or after the washing process and vulcanized during the drying process. There is no longer any need for an additional coating process. This represents a significant saving of energy, time and costs.

Airbags are frequently manufactured using coated wovens. Wovens coated according to the present invention exhibit technical advantages over other coated wovens. The coating according to this invention offers protection against the hot gases of the propellant charge. Yarn-to-yarn friction, which leads to reduction in the tensile strength and is created by vibrations, can be reduced significantly or prevented by an elastomer coating according to the present invention. The coating according to this invention confers better aging and flame resistance to the fabric. A further advantage of the coating process of this invention is that the costs of an additional coating step are saved.

According to the invention, there is provided an aqueous silicone system which is applied to the fabric directly after washing while it is still wet, which can be vulcanized during the drying step. This coating system according to the present invention is an aqueous silicone coating system which, after vulcanization, has an ideal property profile for an airbag.

EXAMPLES

Example 1

4000 g of an aqueous emulsion containing 800 g of a dimethylpolysiloxane having vinyldimethylsiloxy units as terminal units and a viscosity of 1000 mPa·s, 800 g of a dimethylpolysiloxane having vinyldimethylsiloxy units as terminal units and a viscosity of 20,000 mPa·s, 20 g of a platinum-divinyltetramethyldisiloxane complex containing 1% by weight of platinum, 10 g of ethynylcyclohexanol, 90 g of a trimethylsiloxy-capped diorganopolysiloxane with 50 mol % of methylhydrogensiloxane units and 50 mol % of dimethylsiloxane units and a viscosity of 120 mPa·s, and 150 g of an organosilicon adhesion promoter prepared by reaction of 100 g of vinyltriacetoxysilane with 130 g of the silane of the formula

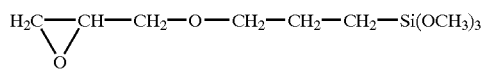

and 1080 g of an aqueous dispersion of a lampblack having a primary particle size of 15 nm and a solids content of 21% by weight, and also 300 g of an aqueous emulsion of a silicone resin of the formula

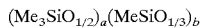

with a neat viscosity of 2000 mPa·s, are mixed by stirring at room temperature and atmospheric pressure. This mixture is introduced into a dip trough at room temperature (25° C.) and atmospheric pressure. A lick-roller is used to transfer this emulsion to a wet 235 dtex polyamide fabric. The coated fabric passes through a heat duct with an air temperature of 100° C. in the first zone and an air temperature of 180° C. in a second zone. The residence time in this heat duct is 3 minutes.

The fabric obtained has a silicone coating of 34 g/m². The fabric has the following properties:

| DIN 53530 air permeability: | 1.16 l/dm²/min |
| DIN 53530 coating adhesion: | 80 N/5 cm |
| ISO 5981 scrub test | not less than 600 |
| FMVSS 302 combustion rate | 45 mm/min |

The FMVSS 302 combustion rate is determined in the horizontal burn test.

Comparative Example 2

Example 1 is repeated without a carbon black component. The fabric obtained has the following properties:

| Coating weight: | 18 g/m² |
| DIN 53887 air permeability: | 1.16 l/dm²/min |
| DIN 53530 coating adhesion: | 80 N/5 cm |
| ISO 5981 scrub test | 600 |
| FMVSS 302 combustion rate | 70 mm/min |

The FMVSS 302 combustion rate is determined in the horizontal burn test.

Example 3

Example 1 is repeated with the one difference that the lampblack in the formulation described in Example 1 is replaced by 200 g of an aqueous dispersion of furnace black having a solids content of 48% by weight and a primary particle size of 27 nm.

A 110 dtex woven fabric was coated. The fabric obtained has the following properties:

| | |
|---|---|
| Coating weight: | 17 g/m² |
| DIN 53887 air permeability: | 1.24 l/dm²/min |
| DIN 53530 coating adhesion: | 110 N/5 cm |
| ISO 5981 scrub test | 800 |
| FMVSS 302 combustion rate | self-extinguishing |

The FMVSS 302 combustion rate is determined in the horizontal burn test.

Example 4

Example 3 is repeated without the addition of a carbon black dispersion. The fabric obtained has the following properties:

| | |
|---|---|
| Coating weight: | 16 g/m² |
| DIN 53887 air permeability: | 1.22 l/dm²/min |
| DIN 53530 coating adhesion: | 100 N/5 cm |
| ISO 5981 scrub test | 800 |
| FMVSS 302 combustion rate | 115 mm/min |

The FMVSS 302 combustion rate is determined in the horizontal burn test.

What is claimed is:

1. An aqueous emulsion comprising
   (1) organopolysiloxanes containing SiC-bonded aliphatically unsaturated groups in terminal units, capable of being emulsified in water and having a dynamic viscosity of 100–550,000 mPa·s,
   (2) organopolysiloxanes containing at least 3 Si-bonded hydrogen atoms,
   (3) a catalyst which promotes the addition of Si-bonded hydrogen to aliphatic unsaturation,
   (4) organosilicon adhesion promoters,
   (5) silicone resin,
   (6) an emulsifier,
   (7) water, and
   (8) carbon black.

2. An aqueous emulsion as claimed in claim 1, where said organopolysiloxanes (1) have the general formula

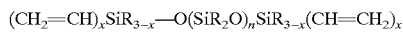

where R denotes identical or different hydrocarbyl radicals, which may be substituted,
   x is 1, 2 or 3, and
   n is a number such that said organopolysiloxanes (1) have an average viscosity of 500–100,000 mPa·s at 25° C.

3. An aqueous emulsion as claimed in claim 1, wherein said organopolysiloxanes (2) have the general formula

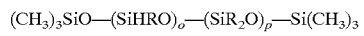

where the ratio of o to p is in the range from 1:0 to 1:20.

4. An aqueous emulsion as claimed in claim 2, wherein said organopolysiloxanes (2) have the general formula

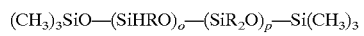

where the ratio of o to p is in the range from 1:0 to 1:20.

5. An aqueous emulsion as claimed in claim 1, wherein said silicone resin (5) comprises a silicone resin of the general formula $(R_3SiO_{1/2})_a(RSiO_{3/2})_b$, an MT resin and/or MQ resin of the general formula $(R_3SiO_{1/2})_a(SiO_{4/2})_b$, where the ratio of a to b is such that said silicone resins are in the viscosity range of 30–300,000 mPa·s at 25° C.

6. An aqueous emulsion as claimed in claim 2, wherein said silicone resin (5) comprises a silicone resin of the general formula $(R_3SiO_{1/2})_a(RSiO_{3/2})_b$, an MT resin and/or MQ resin of the general formula $(R_3SiO_{1/2})_a(SiO_{4/2})_b$, where the ratio of a to b is such that said silicone resins are in the viscosity range of 30–300,000 mPa·s at 25° C.

7. An aqueous emulsion as claimed in claim 3, wherein said silicone resin (5) comprises a silicone resin of the general formula $(R_3SiO_{1/2})_a(RSiO_{3/2})_b$, an MT resin and/or MQ resin of the general formula $(R_3SiO_{1/2})_a(SiO_{4/2})_b$, where the ratio of a to b is such that said silicone resins are in the viscosity range of 30–300,000 mPa·s at 25° C.

8. A process for preparing an aqueous emulsion as claimed in claim 1, which comprises emulsifying ingredients 1–7.

9. A vulcanizate prepared by heating an aqueous emulsion as claimed in claim 1.

10. A process for coating a textile substrate, which comprises applying an aqueous emulsion as claimed in claim 1, to a textile and, in one step, vulcanizing said emulsion on said textile substrate and drying the coated textile.

11. A process for coating a textile substrate, which comprises applying an aqueous emulsion as claimed in claim 2, to a textile and, in one step, vulcanizing said emulsion on said textile substrate and drying the coated textile.

12. A process for coating a textile substrate, which comprises applying an aqueous emulsion as claimed in claim 3, to a textile and, in one step, vulcanizing said emulsion on said textile substrate and drying the coated textile.

13. A coated textile substrate comprising a textile substrate coated with an emulsion as claimed in claim 1.

14. A coated textile substrate comprising a textile substrate coated with an emulsion as claimed in claim 2.

15. A coated textile substrate comprising a textile substrate coated with an emulsion as claimed in claim 3.

16. The coated textile substrate of claim 13 which comprises an airbag.

* * * * *